United States Patent [19]

Cull et al.

[11] 4,344,867

[45] Aug. 17, 1982

[54] HYDROPROCESSING CATALYSTS

[75] Inventors: Neville L. Cull, Baker; Willard H. Sawyer, Baton Rouge, both of La.

[73] Assignee: Exxon Research & Engineering Co., Florham Park, N.J.

[21] Appl. No.: 65,958

[22] Filed: Aug. 13, 1979

[51] Int. Cl.³ .................. B01J 21/04; B01J 23/85; B01J 23/88; B01J 27/04
[52] U.S. Cl. .............. 252/439; 252/455 R; 252/465; 208/216 R
[58] Field of Search .............. 252/455 R, 462, 465, 252/439

[56] References Cited

U.S. PATENT DOCUMENTS

| | | |
|---|---|---|
| Re. 29,771 | 9/1978 | Cull et al. .............. 252/455 R |
| 3,132,111 | 5/1964 | Erickson et al. .............. 252/465 X |
| 3,652,449 | 3/1972 | Young et al. .............. 208/111 |
| 3,840,473 | 10/1974 | Beuther et al. .............. 252/439 |
| 3,972,833 | 8/1976 | Michalko et al. .............. 252/455 R |
| 4,082,697 | 4/1978 | Tamm .............. 252/466 PT |
| 4,128,505 | 12/1978 | Mikovsky et al. .............. 252/465 |
| 4,133,777 | 1/1979 | Frayer et al. .............. 252/465 |
| 4,177,163 | 12/1979 | Oleck et al. .............. 252/462 X |

*Primary Examiner*—W. J. Shine
*Attorney, Agent, or Firm*—Marthe L. Gibbons

[57] ABSTRACT

A catalyst comprising Group VIB and Group VIII metal components and a support prepared by treating alpha alumina monohydrate with an acid solution comprising a hydrolyzable metal salt, such as zirconium nitrate.

13 Claims, No Drawings

HYDROPROCESSING CATALYSTS

BACKGROUND OF THE INVENTION

1. Field of the Invention

This invention relates to a catalyst for hydrodesulfurization of mineral oils. More particularly, this invention relates to a catalyst comprising Group VIB and Group VIII metal components composited with an alumina support prepared by a specified method.

2. Description of the Prior Art

Hydrodesulfurization processes in which heavy hydrocarbon oils or residual oils are treated with hydrogen in the presence of a catalyst comprising a hydrogenation component composited with a refractory oxide support, such as alumina, are well-known.

It is known to prepare a zirconia-coated alumina and thereafter to impregnate the coated alumina with a solution of the desired active metal to produce catalysts or sorbents. See U.S. Pat. No. Re. 29,771.

A hydrodesulfurization catalyst is also known which comprises a non-zeolitic refractory oxide carrier, Group VIB and Group VIII hydrogenation components and a Group IVB metal oxide, which may be zirconia. See U.S. Pat. No. 3,840,473.

It is known to prepare a porous catalyst carrier by treating a powdered solid comprised of predominantly alpha alumina monohydrate with a monobasic acid, followed by neutralization with a base such as ammonia, drying and calcining. See U.S. Pat. No. 4,082,697. The use of acid-treated boehmite as binder in siliceous catalysts is known. See U.S. Pat. No. 3,652,449.

It has now been found that a catalyst prepared by a specified method has advantages that will become apparent in the ensuing description.

SUMMARY OF THE INVENTION

In accordance with the invention there is provided, a catalyst comprising at least one Group VIB metal component and at least one Group VIII metal component composited with a support, said support having been prepared by the steps which comprise:

(a) treating alpha alumina monohydrate with an acidic solution having a pH of less than about 3, said acid solution comprising a hydrolyzable zirconium salt;

(b) reacting the product resulting from step (a) with a neutralizing agent;

(c) calcining the product resulting from step (b); and (d) recovering a catalyst comprising a Group VIB metal component, a Group VIII metal component, and a support, said support comprising a zirconium component and gamma alumina.

DETAILED DESCRIPTION OF THE INVENTION

The catalysts of the present invention are prepared by compositing Group VIB and Group VIII hydrogenation metal components with a support prepared by treating alpha alumina monohydrate (i.e., boehmite) with an acidic solution having a pH of less than about 3, preferably less than about 1. The acid solution comprises a hydrolyzable salt of zirconium, thereof. If desired, to adjust the pH of the solution, an inorganic acid, such as nitric acid, etc., may be added to the salt solution. Suitable hydrolyzable salts include nitrates, chlorides and acetates of zirconium. Preferably, the hydrolyzable metal salt is a salt of zirconium, such as, for example, zirconyl nitrate.

A sufficient amount of the hydrolyzable metal salt is utilized to give, in the final catalyst, an amount of the corresponding metal, calculated as the metal oxide, of about 1 to 14 weight percent, preferably from about 2 to 6 weight percent, based on the total catalyst. The alpha alumina monohydrate may be treated alone with the acid solution or it may be associated with minor amounts of silica such as from about 0.1 to about 6 weight percent silica when it is treated with the acid solution. Alternatively, if minor amounts of silica are desired in the final catalyst, a source of silica may be added at any suitable stage of the preparation of the catalyst. The alpha alumina monohydrate is treated with the acid solution for a time sufficient to form a viscous mass.

A neutralizing agent, such as a base, is then added to the acid solution. Suitable bases include ammonia, urea, ammonium hydroxide, ammonium carbonate and quaternary ammonium hydroxides. Other bases such as NaOH or KOH could be used, however, ammonia and ammonium hydroxides are preferred to avoid cation contamination. The treated alpha alumina monohydrate associated or modified by the metal constituent of the hydrolyzable metal salt used in the acid treat solution is recovered from the solution, for example, by filtration, and subsequently calcined at a temperature ranging from about 400° C. to about 500° C.

The Group VIB and Group VIII hydrogenation components can be composited with the alumina in several manners to form the final catalyst.

The groups referred to herein are groups of the Periodic Table of Elements in accordance with *Handbook of Chemistry and Physics*, published by Chemical Rubber Company, Cleveland, Ohio, 45th edition.

One method of incorporating the Group VIB metal component is to add a suitable salt of the Group VIB metal to the alpha alumina monohydrate prior to treating it with the acid solution. Another method of incorporating the Group VIB metal component is to impregnate the calcined acid treated alpha alumina monohydrate utilizing an aqueous or a nonaqueous liquid medium containing the desired Group VIB metal component, for example, a salt solution of a desired metal, as is well-known in the art. Suitable Group VIB metal components include metal salts or heteropolyacids that are convertible, under preparation conditions, to the corresponding Group VIB elemental metal, metal oxide or metal sulfide. The preferred Group VIB metal component in the final catalyst is selected from the group consisting of molybdenum oxide, molybdenum sulfide, tungsten oxide, tungsten sulfide and mixtures thereof.

A sufficient amount of the Group VIB metal component is utilized to yield, in the final catalyst, from about 5 to about 30 weight percent, preferably from about 10 to about 16 weight percent of the Group VIB metal component, calculated as the metal oxide, based on the total finished catalyst. When the Group VIB metal component is added, according to the second method, to the already calcined acid treated alpha alumina monohydrate, then the Group VIB impregnated product is calcined thereafter in air at a temperature ranging from about 500° to about 600° C. and atmospheric pressure for a time ranging from about 2 to about 4 hours.

The Group VIII metal component is composited either with the Group IVB-containing calcined material resulting from the first or the second method of incorporation of the Group IVB component. The calcined Group IVB-containing product is impregnated with a Group VIII metal component by utilizing a metal salt of a desired group VIII metal that is convertible, under preparation conditions, to the corresponding elemental metal, metal oxide or metal sulfide of Group VIII. The preferred Group VIII metal component in the final catalyst is selected from the group consisting of nickel oxide, nickel sulfide, cobalt sulfide, cobalt oxide and mixtures thereof. It is preferred that both, a nickel and a cobalt component be present in the catalyst. A sufficient amount of the Group VIII metal component is utilized to yield in the final catalyst from about 1 to about 10 weight percent, preferably from about 3 to about 6 weight percent Groups VIII metal component, calculated as the metal oxide, based on the total catalyst. Thereafter, the Group VIII impregnated product is calcined at a temperature ranging from about 350° to about 550° C., preferably at a temperature ranging from about 370° to about 430° C. at atmospheric pressure for a time ranging from about 2 to about 4 hours.

It should be noted that the alpha alumina monohydrate starting material, as a result of the calcination, is present in the final catalyst as gamma alumina.

The resulting product is a catalyst comprising from about 58 to about 93 weight percent, preferably from about 72 to about 85 weight percent gamma alumina, from about 1 to about 14 weight percent, preferably from about 2 to about 6 weight percent of the metal constituent corresponding to the metal of the hydrolyzable metal salt utilized (e.g., zirconium), calculated as the metal oxide, from about 5 to about 30 weight percent, preferably from about 10 to about 16 weight percent Group VIB metal component, calculated as the metal oxide, and from about 1 to about 10, preferably from about 3 to about 6 weight percent Group VIII metal component, calculated as the metal oxide, based on the total catalyst. A preferred catalyst comprises from about 1.5 to about 2.5 weight percent cobalt oxide, from about 1.5 to about 2.5 weight percent nickel oxide, from about 10 to about 16 weight percent molybdenum oxide, from about 4 to about 6 weight percent zirconium oxide and from about 74 to about 83 weight percent gamma alumina. The finished catalysts obtainable by the preparation method of the present invention have pore volumes ranging from about 0.30 to about 0.70 cc/g, preferably from about 0.45 to about 0.60 cc/g MERPOR method and a surface area ranging from about 100 to about 300 m$^2$/g, preferably from about 150 to about 250 m$^2$/g by the BET method. The surface areas referred to herein are in accordance with the BET method—that is, the nitrogen adsorption method of Brunauer, Emmett and Teller as shown in the *Journal of American Chemical Society*, Volume 16 (1938) pages 309 to 319. The pore volume, unless otherwise specified, is measured by MERPOR, which is a mercury penetration method using porosimeter Model 915-2 manufactured by Micrometritics Corporation, Norcross, Ga. The surface tension of the mercury is taken herein at a contact angle of 140 degrees. A pressure of 50,000 psig is used, unless otherwise specified.

The catalyst of the present invention may be sulfided prior to use in a conventional manner. The catalyst may be disposed in a fixed bed, moving bed, fluidized bed, ebullating bed, disperse phase, etc. The catalyst of the present invention may be used in hydroprocessing hydrocarbonaceous feeds. It is particularly well-suited for the hydrodesulfurization of sulfur-containing hydrocarbon oils.

Suitable hydrodesulfurization conditions, when utilizing the catalyst of the present invention, include a temperature ranging from about 400° to about 850° F., preferably from about 650° to about 850° F., a pressure ranging from about 800 to about 3000 psig, preferably a pressure ranging from about 500 to about 1500 psig.

Suitable chargestocks for the hydrodesulfurization process include sulfur-containing hydrocarbonaceous oils boiling from above about 450° F. at atmospheric pressure, which may contain up to about 8 weight percent sulfur or more, such as, for example, petroleum crude oils, including heavy crude oils; heavy hydrocarbon distillates, boiling in the range of about 650° to about 1050° F. at atmospheric pressure, such as gas oil; residual petroleum oils, such as atmospheric distillation and vacuum distillation bottoms, bitumen; tarsand oils; shale oil; liquids derived from coal liquefaction processes, including coal liquefaction bottoms and mixtures thereof.

PREFERRED EMBODIMENTS

The following examples are presented to illustrate the invention.

EXAMPLE 1

A catalytic support material was prepared by mixing (dry) 69 grams of alumina (a spray dried alumina which is predominantly a boehmite alumina) with 7.5 grams of zirconyl nitrate (ZrO$_2$ content of zirconyl nitrate 51 weight percent). To this was added in increments, 100 ml of deionized water, mixing thoroughly between additions. After all the water had been added and mixed in thoroughly, the alumina-zirconyl nitrate mixture had assumed a viscous dough-like consistency. Sixty ml of about 1 N NH$_4$OH solution was added and mixed in thoroughly. The product was dried in forced air oven (240° F.) overnight. After drying, the product was calcined 16 hours at 1000° F., cracked and screened to give a 14/35 mesh (Tyler) product with a surface area (BET) of 215 m$^2$/g, a pore volume (BET) of 0.45 cc/g, and a pore volume by MERPOR of 0.55 cc/g.

EXAMPLE 2

Ten grams of the 14/35 mesh (Tyler) support material from Example 1 was impregnated with 2.6 grams of phosphomolybdic acid dissolved in methylethyl ketone to make about 5–6 cc of impregnating solution using the incipient wetness technique. After air drying, the catalyst was calcined 3 hours at 1000° F.

The calcined molybdenum on ZrO$_2$-Al$_2$O$_3$ was then impregnated with 1 gram of Co(NO$_3$)$_2$.6H$_2$O and 1 gram of Ni(NO$_3$)$_2$.6H$_2$O dissolved in sufficient acetone to make 6 cc of impregnating solution. The product was air dried, then calcined 3 hours at 700° F. The catalyst appeared dark bluish-green in color and had a surface area (BET) of 179 m$^2$/g and a pore volume (BET) of 0.34 cc/g. This catalyst is a catalyst in accordance with the present invention (Catalyst C).

EXAMPLE 3

Ten grams of support material 14/35 mesh (Tyler) 13752-79, which consisted of 10% ZrO$_2$ prepared by impregnation of gamma alumina with zirconyl nitrate, and having a surface area of 196 m$^2$/g, pore volume 0.48 cc/g, was impregnated with 1.0 g of Co(NO$_3$)$_2$.6H$_2$O; 1.0 g of Ni(NO$_3$)$_2$.6H$_2$O and 2.6 g of phosphomolybdic acid dissolved in acetone to make 9–10 cc of impregnating solution. After air drying 3 hours, the product was calcined 3 hours at 1000° F. The surface area (BET) of the calcined catalyst was 155 m²/g and pore volume was 0.36 cc/g. This catalyst (Catalyst D) is not a catalyst of the present invention.

EXAMPLE 4

Catalysts from Examples 2 and 3 and two commercial hydrotreating catalysts A and B, were tested in a small pilot plant unit using a synthetic model compound feed. The composition of the feed used was (wt. %) 75% tetralin, 15% dibenzothiophene, 6% methyl naphthalene, and 4% acridine.

A catalyst charge of 5 cc was used under the following process conditions: 1 V/Hr/V, 500 psig pressure, 700° F., and a gas rate (hydrogen) of 2000 SCF/bbl.

Prior to testing, all of the catalysts were sulfided overnight at 700° F. using 1.6 liters/hr of 10% $H_2S$ in $H_2$.

The compositions of these catalysts are shown in Table I.

TABLE I

| | | Catalysts | |
|---|---|---|---|
| A | B | C | D |
| NiO, wt. % 3.1 | CoO, wt. % 4.4 | CoO, wt. % 2.0 | CoO, wt. % 2.0 |
| $MoO_3$, wt. % 15.9 | $MoO_3$, wt. % 19.2 | NiO, wt. % 2.0 | NiO, wt. % 2.0 |
| $SiO_2$—$Al_2O_3$, wt. % 75.0 | $Al_2O_3$, wt. % 76.4 | $MoO_3$, wt. % 15.5 | $MoO_3$, wt. % 15.5 |
| $P_2O_5$, wt. % 6.0 | | $ZrO_2$, wt. % 5.5 | $ZrO_2$, wt. % 8.1 |
| | | $Al_2O_3$, wt. % 75.0 | $Al_2O_3$, wt. % 72.4 |

Catalyst C is a catalyst of the present invention whereas Catalyst D is a prior art catalyst prepared under conditions similar to those of U.S. Pat. No. 3,840,473. Catalysts A and B are standard commercial hydrodesulfurization catalysts that do not contain zirconium The results of these tests are summarized in Table II.

TABLE II

| | Catalyst | | | |
|---|---|---|---|---|
| Relative Activity | A | B | C | D |
| Hydrodesulfurization (Dibenzothiophene) | 100 | 143 | 147 | 114 |
| Hydrodenitrogenation (Acridine) | 100 | 88 | 109 | 46 |
| Hydrogenation (Methyl Naphthalene) | 100 | 103 | 204 | 144 |

EXAMPLE 5

Fifty grams of ball-milled boehmite and molybdic oxide (32.7 g $Al_2O_3$ and 5.8 g $MoO_3$ dry basis) were mixed with 4.0 grams of zirconyl nitrate and 7.6 g of $Ni(NO_3)_2.6H_2O$ in 80 cc of water. After thorough mixing, a solution comprising 14 cc of 6 N ammonium hydroxide plus 10 cc of water was added followed again by thorough mixing. The product was allowed to air dry and was then calcined 3 hours at 800° F. The calcined catalyst was cracked and screened to give a 14/35 mesh (Tyler) fraction suitable for testing.

The catalyst (calcined) had a BET surface area of about 276 m²/g and a BET pore volume of 0.31 cc/g. The catalyst, which is a catalyst in accordance with the present invention and which is herein designated as Catalyst E, had the following approximate composition:

| Catalyst E Constituents | Wt. % |
|---|---|
| $Al_2O_3$ | 76.8 |
| $MoO_3$ | 12.8 |
| $ZrO_2$ | 4.7 |
| NiO | 4.7 |

Catalyst E was tested at the same conditions and utilizing the same feed as those used in Example 4. The relative activity results are shown in Table III.

TABLE III

| Catalyst | A | E |
|---|---|---|
| Hydrodesulfurization (dibenzothiophene) | 100 | 127 |
| Hydrodenitrogenation (acridine) | 100 | 140 |
| Hydrogenation (methyl naphthalene) | 100 | 182 |

Thus, Catalyst E, which is a catalyst in accordance with the present invention, had good activity even though it was not as active for hydrodesulfurization as Catalyst C.

EXAMPLE 6

A series of catalysts in accordance with the present invention was also prepared based on supports made by the treatment of boehmite alumina with metal salts containing monovalent anions. The composition of the catalysts and the test results are summarized in Table IV.

TABLE IV

| Catalyst | F | G | H | J |
|---|---|---|---|---|
| Metal Salt Used | $Th(NO_3)_4.4H_2O$ | $UO_2(NO_3)_2.6H_2O$ | $Ce(NO_3).6H_2O$* | $Y(NO_3)_3.6HO$* |
| Metal Oxide | $ThO_2$ | $UO_2$ | $CeO_2$ | $Y_2O_3$ |
| Wt. % in Support | 9.4 | 11.6 | 8.9 | 7.8 |
| Catalyst Composition | | | | |
| Wt. % $Al_2O_3$ | 73.0 | 71.3 | 73.4 | 74.4 |
| Wt. % Metal Oxide | 7.6 | 9.3 | 7.2 | 6.3 |
| Wt. % $MoO_3$ | 15.4 | 15.4 | 15.4 | 15.4 |
| Wt. % NiO | 2.0 | 2.0 | 2.0 | 2.0 |
| Wt. % CoO | 2.0 | 2.0 | 2.0 | 2.0 |

*A small amount of $HNO_3$ was used with the metal salt.

These catalysts were tested at the same conditions and utilizing the same feed as in Example 4.

The relative activity results are summarized in Table V.

TABLE V

| Catalyst | C | F | G | H |
|---|---|---|---|---|
| Metals | | Co/Ni/Mo | | |
| Support | ZrO$_2$—Al$_2$O$_3$ | ThO$_2$—Al$_2$O$_3$ | CeO$_2$—Al$_2$O$_3$ | UO$_2$—Al$_2$O$_3$ |
| Relative Activities[1] | | | | |
| Hydrodesulfurization (DBT) | 147 | 111* (114) | 119 | 114 |
| Hydrodenitrogenation (acridine) | 109 | 221 (63) | 70 | 67 |
| Hydrogenation (MNAP) | 204 | 191 (166) | 176 | 159 |

[1]Relative to Catalyst A
*First balance (lined-out data)

Other metal oxides showed similar effects compared to zirconia but none showed as good a combined performance for all the reactions as Catalyst C.

Catalysts C, F, G, H and J showed superior hydrogenation performance compared to Catalysts A and B. Catalyst F, the ThO$_2$ catalyst, showed initially a high hydrodenitrogenation activity but the activity declined after a few days on oil.

What is claimed is:

1. A catalyst comprising at least one Group VIB metal component and at least one Group VIII metal component composited with a support, said support having been prepared by the steps which comprise:
   (a) treating alpha alumina monohydrate with an acidic solution having a pH of less than about 3, said acid solution comprising a hydrolyzable zirconium salt;
   (b) reacting the product resulting from step (a) with a neutralizing agent;
   (c) calcining the product resulting from step (b), and
   (d) recovering a catalyst comprising a Group VIB metal component, a Group VIII metal component, and a support, said support comprising a zirconium component and gamma alumina.

2. The catalyst of claim 1 wherein said Group VIB metal component is added to said alpha alumina monohydrate prior to treating said alpha alumina monohydrate with said acidic solution.

3. The catalyst of claim 1 wherein after said acidic solution-treated alpha alumina monohydrate is calcined, the calcined-treated alumina is impregnated with said Group VIB metal component, followed by calcination of the Group VIB metal-containing product, impregnating the calcined Group VIB-containing product with at least one Group VIII metal component, and calcining the resulting product.

4. The catalyst of claim 3 wherein said calcined Group VIB-containing product is impregnated with said Group VIII metal component and, thereafter, the Group VIII-containing resulting product is calcined.

5. The catalyst of claim 1 wherein said acidic solution additionally comprises an inorganic acid.

6. The catalyst of claim 1 wherein a source of silica is added to said alpha alumina monohydrate and wherein the recovered catalyst comprises from about 0.1 to about 6 weight percent silica.

7. The catalyst of claim 1 wherein said Group VIB metal component in said recovered catalyst is selected from the group consisting of elemental metal, metal oxide and metal sulfide of Group VIB and mixtures thereof and wherein said Group VIII metal component of said recovered catalyst is selected from the group consisting of elemental metal, metal oxide, metal sulfide of Group VIII and mixtures thereof.

8. The catalyst of claim 1 wherein said Group VIB metal component of said recovered catalyst is selected from the group consisting of molybdenum oxide, molybdenum sulfide, tungsten oxide, tungsten sulfide and mixtures thereof, and wherein said Group VIII metal component of said recovered catalyst is selected from the group consisting of cobalt oxide, cobalt sulfide, nickel oxide, nickel sulfide, and mixtures thereof.

9. The catalyst of claim 1 wherein said recovered catalyst comprises from about 1 to about 14 weight percent of said zirconium calculated as the metal oxide thereof, from about 5 to about 30 weight percent of said Group VIB metal component, calculated as the metal oxide thereof and from about 1 to about 10 weight percent of said Group VIII metal component, calculated as the metal oxide thereof, all said weights being based on the total recovered catalyst.

10. The catalyst of claim 1 wherein said calcination of step (b) is conducted at a temperature ranging from about 400° to about 500° C.

11. The catalyst of claim 3 wherein said Group VIB metal-containing product is calcined at a temperature ranging from about 500° to about 600° C. and wherein said Group VIII impregnated product is calcined at a temperature ranging from about 350° to about 550° C.

12. The catalyst of claim 1 wherein said catalyst is a hydrodesulfurization catalyst.

13. The catalyst of claim 1, wherein said Group VIB is a molybdenum component, said Group VIII is a cobalt component and a nickel component and wherein said recovered catalyst comprises from about 4.0 to about 6.0 weight percent zirconium, calculated as zirconium oxide; from about 1.5 to about 2.5 weight percent nickel, calculated as nickel oxide; from about 1.5 to about 2.5 weight percent cobalt, calculated as cobalt oxide; from about 10 to about 16 weight percent molybdenum, calculated as molybdenum oxide, and from about 74 to about 83 weight percent gamma alumina.

* * * * *